(12) United States Patent
Frossard et al.

(10) Patent No.: US 7,006,567 B2
(45) Date of Patent: Feb. 28, 2006

(54) SYSTEM AND METHOD FOR ENCODING THREE-DIMENSIONAL SIGNALS USING A MATCHING PURSUIT ALGORITHM

(75) Inventors: Pascal Frossard, Harrison, NY (US); Pierre Vandergheynst, Berolle (CH); Olivier Verscheure, Harrison, NY (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 10/092,267

(22) Filed: Mar. 6, 2002

(65) Prior Publication Data

US 2003/0108101 A1    Jun. 12, 2003

Related U.S. Application Data

(60) Provisional application No. 60/334,521, filed on Nov. 30, 2001.

(51) Int. Cl.
*H04N 7/12* (2006.01)
(52) U.S. Cl. .................................. 375/240.03
(58) Field of Classification Search ........... 375/240.03, 375/240.01, 240.02, 240.19, 240.08, 240.09; 348/375.1, 403.1, 422.1; 382/240, 241, 242, 382/243, 248; 345/660; H04N 7/12
See application file for complete search history.

(56) References Cited

U.S. PATENT DOCUMENTS

| | | | |
|---|---|---|---|
| 5,214,766 A * | 5/1993 | Liu ............................. | 711/124 |
| 5,515,490 A | 5/1996 | Buchanan et al. .......... | 395/154 |
| 5,592,667 A | 1/1997 | Bugajski ..................... | 395/613 |
| 5,818,716 A * | 10/1998 | Chin et al. ................... | 700/100 |
| 5,953,506 A | 9/1999 | Kalra et al. ................. | 395/200 |
| 6,148,106 A | 11/2000 | Impagliazzo ................ | 382/224 |
| 6,157,396 A | 12/2000 | Margulis et al. ............ | 345/506 |
| 6,537,233 B1 * | 3/2003 | Rangayyan et al. ........ | 600/586 |
| 6,625,213 B1 * | 9/2003 | Bottreau et al. ....... | 375/240.08 |
| 6,628,300 B1 * | 9/2003 | Amini et al. ............... | 345/660 |

\* cited by examiner

*Primary Examiner*—Nhon Diep
(74) *Attorney, Agent, or Firm*—Anne Vachon Dougherty

(57) ABSTRACT

An apparatus and method to represent a video signal for improved source quality versus decoding complexity for a given compression rate and improved resistance against data loss when delivered over an error-prone network. The method comprises a 3-D matching pursuit algorithm with an improved 3-D dictionary. The 3-D MP encoder transforms blocks of frames into a set of spatio-temporal functions from the improved dictionary. The 3-D coder outputs a video stream that is highly resistant to data loss. Also, the proposed dictionary is optimized for source quality versus decoding complexity for a given compression rate.

13 Claims, 6 Drawing Sheets

Frame 0

Frame 1

Frame 2

Frame 3

Frame 0

Frame 1

Frame 2

Frame 3

SYSTEM AND METHOD FOR ENCODING THREE-DIMENSIONAL SIGNALS USING A MATCHING PURSUIT ALGORITHM

CROSS REFERENCE TO RELATED APPLICATIONS

This application claims the benefit under 35 USC 119(c) of U.S. provisional application 60/334,521, which was filed on Nov. 30, 2001. The application also relates to the co-pending patent application entitled "System and Method for Equal Perceptual Relevance Packetization of Data", Ser. No. 10/091,933 filed Mar. 6, 2002, which claims the benefit under 35 USC 119(c) of U.S. provisional application 60/334, 521, filed Nov. 30, 2001, as well as U.S. Pat. No. 6,628,300 patent entitled "Transcoding Proxy and Method for Transcoding Encoded Streams", which claims the benefit under 35 USC 119(c) of U.S. provisional application 60/334, 514, filed Nov. 30, 2001 and which issued on Sep. 30, 2003.

FIELD OF THE INVENTION

This invention relates generally to digital signal representation, and more particularly to an apparatus and method to compress a video signal for improved source quality versus decoding complexity for a given compression bit rate and improved resistance against data loss when delivered over an error-prone network. Further, the invention provides an apparatus and method to improve the delivery quality of digital multimedia streams over a lossy packet network.

BACKGROUND OF THE INVENTION

The purpose of source coding (or compression) is data rate reduction. For example, the data rate of an uncompressed NTSC (National Television Systems Committee) TV-resolution video stream is close to 170 Mbps, which corresponds to less than 30 seconds of recording time on a regular compact disk (CD). The choice of a compression standard depends primarily on the available transmission or storage capacity as well as the features required by the application. The most often cited video standards are H.263, H.261, MPEG-1 and MPEG-2 (Moving Picture Experts Group). The aforementioned video compression standards are based on the techniques of discrete cosine transform (DCT) and motion prediction, even though each standard targets a different application (i.e., different encoding rates and qualities). The applications range from desktop video-conferencing to TV channel broadcasts over satellite, cable, and other broadcast channels. The former typically uses H.261 or H.263 while MPEG-2 is the most appropriate compression standard for the video broadcast applications.

Motion prediction operates to efficiently reduce the temporal redundancy inherent to most video signals. The resulting predictive structure of the signal, however, makes it vulnerable to data loss when delivered over an error-prone network. Indeed, when data loss occurs in a reference picture, the lost video areas will affect the predicted video areas in subsequent frame(s), in an effect known as temporal propagation.

Tri-dimensional (3-D) transforms offer an alternative to motion prediction. In this case, temporal redundancy is reduced the way spatial redundancy is; that is, using a mathematical transform for the third dimension (e.g., wavelets, DCT). Algorithms based on 3-D transforms have proven to be as efficient as coding standards such as MPEG-2, and comparable in coding efficiency to H.263. In addition, error resilience is improved since compressed 3-D blocks are self-decodable.

Non-orthogonal transforms present several properties that provide an interesting alternative to orthogonal transforms like DCT or wavelet. Decomposing a signal over a redundant dictionary improves the compression efficiency, especially at low bit rates where most of the signal energy is captured by few elements. Moreover, video signals issued from decomposition over a redundant dictionary are more resistant to data loss. The main limitation of non-orthogonal transforms is encoding complexity.

Matching pursuit algorithms provide a way to iteratively decompose a signal into its most important features with limited complexity. The matching pursuit algorithm will output a stream composed of both atom parameters and their respective coefficients. The problem with the state-of-the-art in matching pursuit is that the dictionaries do not address the need for decomposition along both the spatial and temporal domains, and also the optimization of source coding quality versus decoding complexity for a given bit rate.

The art in Matching Pursuit (MP) coding is limited. A publication by S. G. Mallat and Z. Zhang, entitled "Matching Pursuits With Time-Frequency Dictionaries", Transactions on Signal Processing, Vol. 41, No. 12, December 1993 details one application of matching pursuit coding. In addition, the publication entitled "Very Low Bit-Rate Video Coding Based on Matching Pursuits", by R. Neff and A. Zakhor, Circuits and Systems for Video Technology, Vol. 7, No. 1, February 1997, the publication entitled "Decoder Complexity and Performance Comparison of Matching Pursuit and DCT-Based MPEG-4 Video Codecs", by R. Neff, T. Nomura and A. Zakhor, Circuits and Systems for Video Technology, Vol. 7, No. 1, February 1997, and U.S. Pat. No. 5,699,121, detail using a 2-D matching pursuit coder to compress the residual prediction error resulting from motion prediction.

The shortcomings of the prior art include, first, that matching pursuit has never been proposed for coding 3-D signals. Second, the basic functions have been limited to Gabor functions because they were proven to minimize the uncertainty principle. However these functions are generally isotropic (same scale along x- and y-axes) and do not address image characteristics such as contours and textures.

What is needed, therefore, is a system and method to represent a video signal for improved source quality versus decoding complexity for a given compression rate and improved resistance to data loss when delivered over an error prone network.

SUMMARY OF THE INVENTION

The foregoing and other objectives are realized by the present invention, which alleviates the problems related to hybrid DCT/motion prediction coding by using a 3-D matching pursuit algorithm. The invention defines a separable 3-D structured dictionary. The resulting representation of the input signal is highly resistant to data loss (non-orthogonal transforms). Also, it improves the source coding quality versus decoding requirements for a given target bit rate (anisotropy of the dictionary). The invention disclosed herein provides an apparatus and method to compress a video signal for improved source quality versus decoding complexity for a given compression rate and improved resistance against data loss when delivered over an error-prone network. The method relies on a 3-D matching pursuit algorithm with an improved 3-D dictionary. The 3-D MP encoder transforms blocks of frames into a set of spatio-temporal functions from the improved dictionary. The 3-D coder outputs a video stream that is highly resistant to data loss. Also, the proposed dictionary is optimized for source quality versus decoding complexity for a given compression rate. The present invention mainly targets asymmetric applications (high-end PC for encoding and a wide range of devices for decoding).

BRIEF DESCRIPTION OF THE DRAWINGS

The advantages of the present invention will become readily apparent to those ordinarily skilled in the art after reviewing the following detailed description and accompanying drawings, wherein.

DETAILED DESCRIPTION OF THE INVENTION

The present invention alleviates the problems related to hybrid DCT/motion prediction coding by using a 3-D matching pursuit algorithm. The invention defines a separable 3-D structured dictionary. The resulting representation of the input signal is highly resistant to data loss (non-orthogonal transforms). Also, it improves the source coding quality versus decoding requirements for a given target bit rate (anisotropy of the dictionary).

Figure 3:
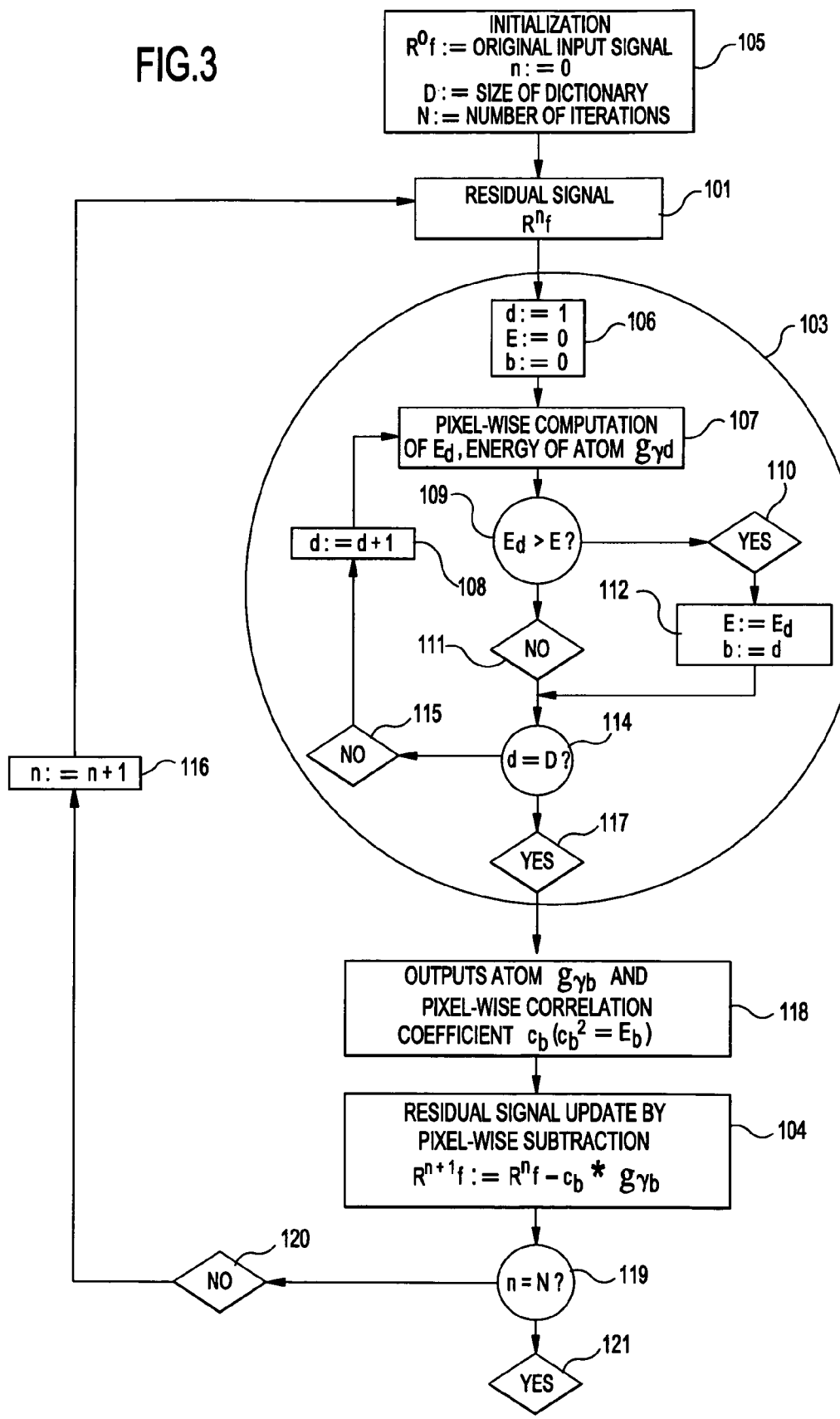
FIG. 3 is a flow graph illustrating the Matching Pursuit iterative algorithm of FIG. 2.

Matching Pursuit (MP) is an adaptive algorithm that iteratively decomposes a function $f \in L^2(\Re)$ (e.g., image, video) over a possibly redundant dictionary of functions called atoms (see FIG. 3). Let $D=\{g_\gamma\}_{\gamma \in \Gamma}$ be such a dictionary with $\|g_\gamma\|=1$. $f$ is first decomposed into:

$$f = \langle g_{\gamma 0} | f \rangle g_{\gamma 0} + Rf,$$

where $\langle g_{\gamma 0} | f \rangle g_{\gamma 0}$ represents the projection of $f$ onto $g_{\gamma 0}$ and $Rf$ is the residual component. Since all elements in D have a unit norm, $g_{\gamma 0}$ is orthogonal to $Rf$, and this leads to:

$$\|f\|^2 = |\langle g_{\gamma 0} | f \rangle|^2 + \|Rf\|^2.$$

In order to minimize $\|Rf\|$ and thus optimize compression, one must choose $g_{\gamma 0}$ such that the projection coefficient $|\langle g_{\gamma 0}|f\rangle|$ is maximum. Applying the same strategy to the residual component carries the pursuit further. After N iterations, one has the following decomposition for $f$:

$$f = \sum_{n=0}^{N-1} \langle g_{\gamma n} | R^n f \rangle g_{\gamma n} + R^N f,$$

with, $R^0 f = f$. Similarly, the energy $\|f\|^2$ is decomposed into:

$$\|f\|^2 = \sum_{n=0}^{N-1} |\langle g_{\gamma n} | R^n f \rangle|^2 + \|R^N f\|^2.$$

Although matching pursuit places very few restrictions on the dictionary set, the structure of the latter is strongly related to convergence speed and thus to coding efficiency. The decay of the residual energy $\|R^n f\|^2$ has indeed been shown to be upper-bounded by an exponential, whose parameters depend on the dictionary. However, true optimization of the dictionary can be very difficult. Any collection of arbitrarily sized and shaped functions can be used, as long as completeness is respected.

The method of the present invention is useful in a variety of applications where it is desired to produce a low to medium bit rate video stream to be delivered over an error-prone network and decoded by a set of heterogeneous devices.

Let first the dictionary define the set of basic functions used for the signal representation. The basic functions are called atoms. The atoms are represented by a possibly multi-dimensional index $\gamma$, and the index along with a correlation coefficient $c_{\gamma_i}$ forms an MP iteration.

Figure 1:
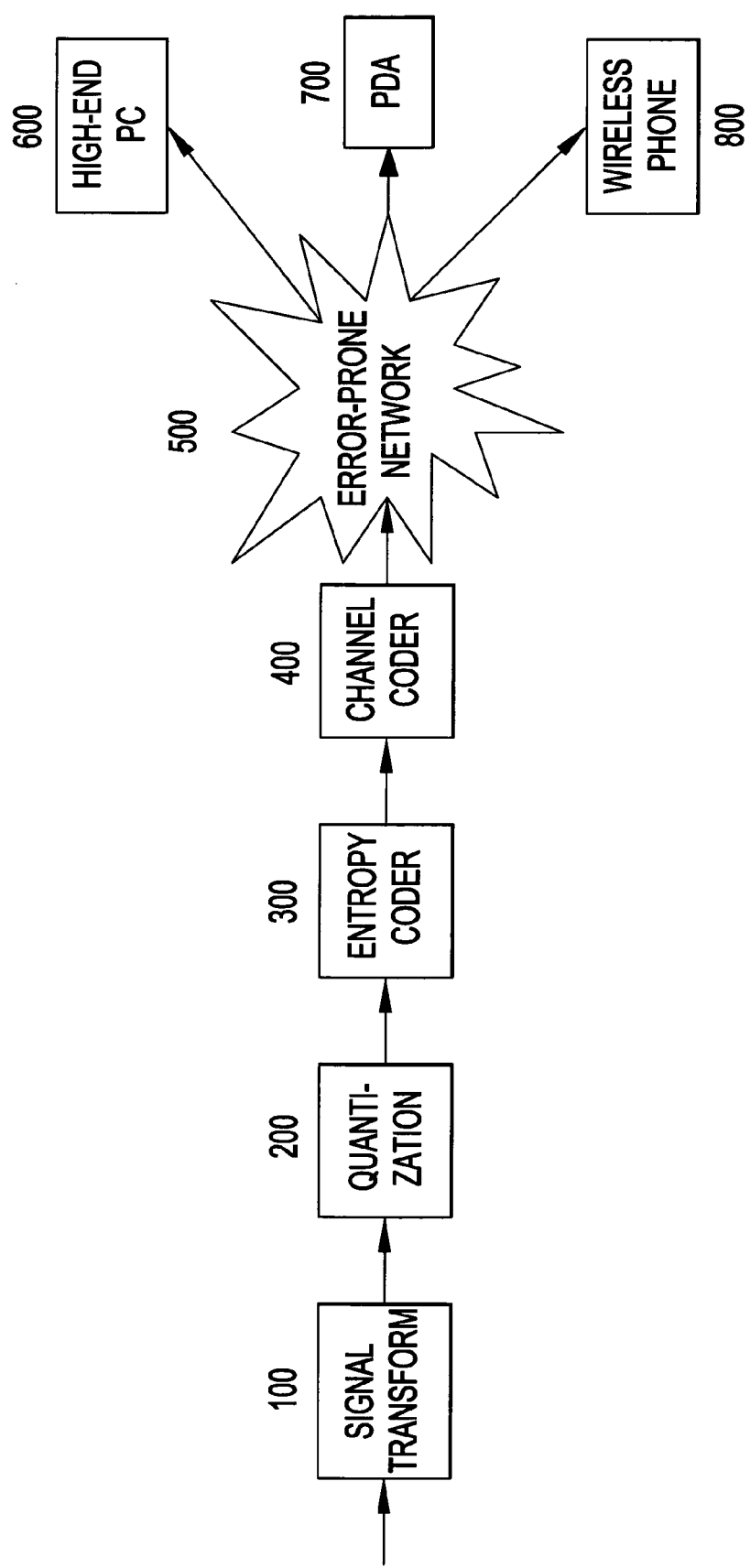
FIG. 1 is a block diagram illustrating the overall architecture in which the present invention takes place.
Figure 2:
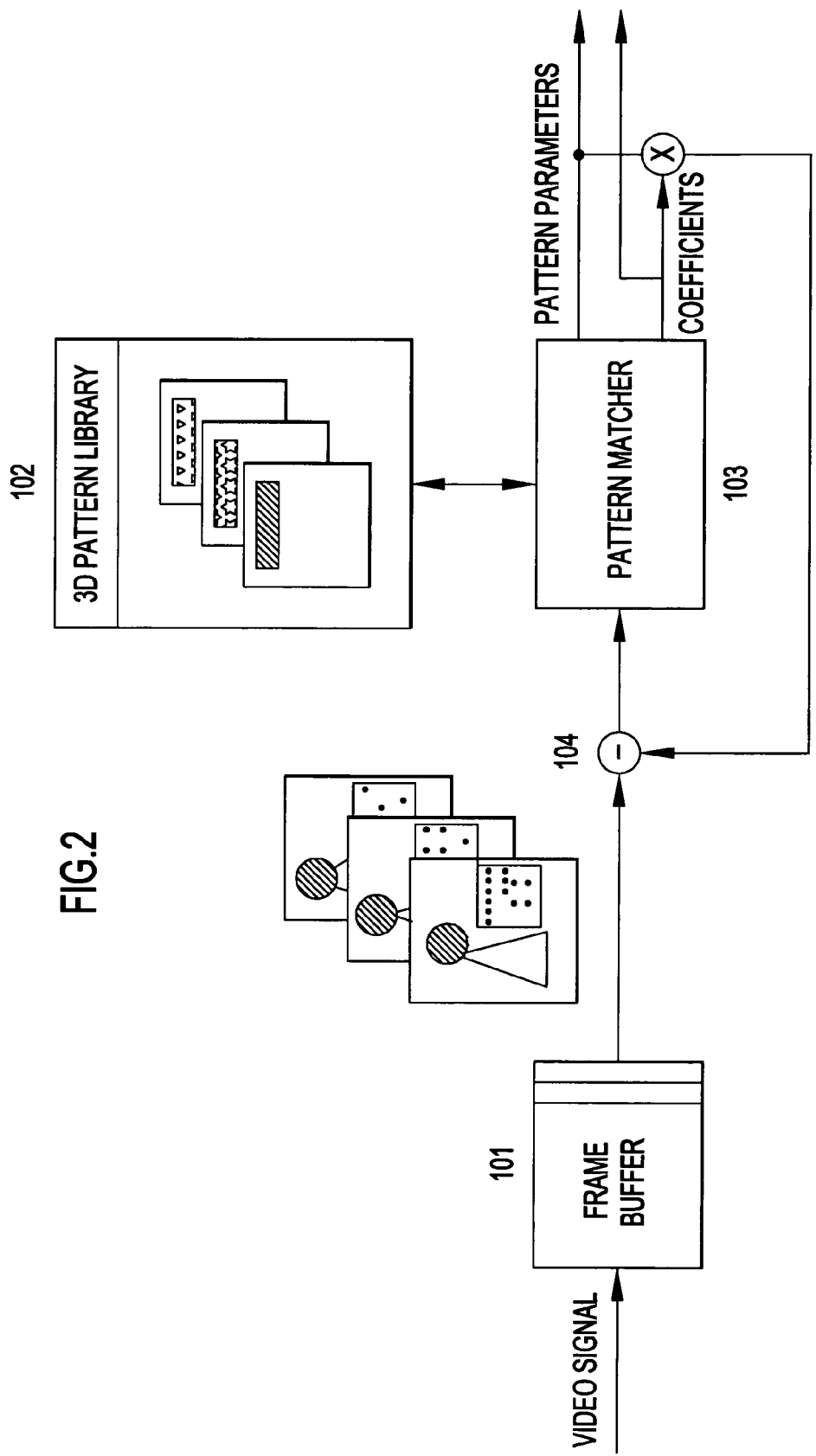
FIG. 2 illustrates the Signal Transform Block 100 from FIG. 1.

The method of the present invention then is as follows. As illustrated in FIG. 2, the original video signal $f$ is first passed to a Frame Buffer 101 to form groups of K video frames of dimension X×Y. The method of the present invention thus decomposes the input video sequence into K-frames long independent 3D blocks. The dictionary 102 is composed of atoms, which are also 3-D functions of the same size, i.e., K×X×Y. The method as shown in FIG. 3 iteratively compares the residual 3-D function with the dictionary atoms and elects in the Pattern Matcher 103 the 3-D atom that best matches the residual signal (i.e., the atom which best correlates with the residual signal). The parameters of the elected atom, which are the index $\gamma$ and the coefficient $c_{\gamma_i}$ are sent across to the following block performing the Coding (i.e., quantization, entropy coding probably followed by channel coding, as shown in FIG. 1). The pursuit continues up to a predefined number of iterations N, which is either imposed by the user, or deduced from a rate constraint and/or a source coding quality constraint.

The method relies on a structured 3-D dictionary 102, which allows for a good trade-off between dictionary size and compression efficiency. In our method, the dictionary is constructed from separable temporal and spatial functions, since features to capture are different in spatial and temporal domains. An atom dictionary is therefore written as $g_\gamma(x,y,k) = \Psi^{-1} \times S_{\gamma s}(x,y) \times T_{\gamma t}(k)$, where $\gamma$ corresponds to the parameters that transform the generating function. The parameter $\Psi$ is chosen so that each atom is normalized, i.e., $\|g_\gamma(x,y,k)\|^2 = 1$. Each entry of the dictionary therefore consists in a series of 7 parameters. The first 5 parameters specify position, dilation and rotation of the spatial function of the atom, $S_{\gamma s}(x,y)$. The last 2 parameters specify the position and dilation of the temporal part of the atom, $T_{\gamma t}(k)$.

The spatial function in a preferred embodiment of the present invention is generated using B-splines, which provides the advantages of having a limited and calculable support, and optimizes the trade-off between compression efficiency (i.e., source coding quality for a given target bit rate) and decoding requirements (i.e., CPU and memory requirements to decode the input bit Stream). A B-spline of order n is given by:

$$\beta^n(x) = \frac{1}{n!} \sum_{k=0}^{n+1} \binom{n+1}{k} (-1)^k \left[ x - k + \frac{n+1}{2} \right]_+^n,$$

where $[y]_+^n$ represents the positive part of $y^n$.

The 2-D B-spline is formed with a 3rd order B-spline in one direction, and its first derivative in the orthogonal direction to catch edges and contours. Rotation, translation and anisotropic dilation of the B-spline generates an overcomplete dictionary. The anisotropic refinement permits to use different dilation along the orthogonal axes, in opposition to Gabor atoms. Thus the spatial dictionary maximizes the trade-off between coding quality and decoding complexity for a specified source rate. The spatial function of the 3-D atoms can be written as $S_{\gamma s} = S_{\gamma x}^x \times S_{\gamma y}^y$, with:

$$S_{\gamma x}^x(x) = \beta^3 \left( \frac{\cos(\varphi)(x - p_x) + \sin(\varphi)(y - p_y)}{d_x} \right),$$

$$S_{\gamma y}^y(y) = \beta^2 \left( \frac{\sin(\varphi)(x - p_x) - \cos(\varphi)(y - p_y)}{d_y} + \frac{1}{2} \right) - \beta^2 \left( \frac{\sin(\varphi)(x - p_x) - \cos(\varphi)(y - p_y)}{d_y} - \frac{1}{2} \right).$$

The index $\gamma_s$ is thus given by 5 parameters; these are two parameters to describe an atom's spatial position $(p_x, p_y)$, two parameters to describe the spatial dilation of the atom $(d_x, d_y)$, and the rotation parameter $\varphi$.

The temporal function is designed to efficiently capture the redundancy between adjacent video frames. Therefore $T_{\gamma t}(k)$ is a simple rectangular function written as:

$$T_{\gamma t}(k) = \begin{cases} 1 & \text{if } p_k \leq k < p_k + d_k \\ 0 & \text{otherwise} \end{cases}.$$

The temporal index $\gamma_t$ is here given by 2 parameters; these are one parameter to describe the atom's temporal position $p_k$ and one parameter to describe the temporal dilation $d_k$.

The index parameters range $(p_x, p_y, p_k, d_x, d_y, d_k, \varphi)$ is designed to cover the size of the input signal. Spatial-temporal positions allow to completely browse the 3D input signal, and the dilations values follow an exponential distribution up to the 3D input signal size. The basis functions may however be trained on typical input signal sets to determine a minimal dictionary, trading off the compression efficiency.

FIG. 1 is a block diagram illustrating the overall architecture in which the present invention takes place. The Signal Transform block 100 is the focus of this invention at which the foregoing transformation takes place. After transformation, the digital signal is quantized 200, entropy coded 300 and packetized 400 for delivery over the error-prone network 500. A wide range of decoding devices are targeted; from a high-end PC 600, to PDAs 700 and wireless devices 800.

FIG. 2 illustrates the Signal Transform Block 100. The video sequence is fed into a frame buffer 101, and where a spatio-temporal signal is formed. This signal is iteratively compared to functions of a Pattern Library 102 through a Pattern Matcher 103. The parameters of the chosen atoms are then sent to the quantization block 200, and the corresponding features are subtracted from the input spatio-temporal signal.

FIG. 3 is a flow chart illustrating the Matching Pursuit iterative algorithm of FIG. 2. The Residual signal 101, which consists in the input video signal at the beginning of the Pursuit, is compared to a library of functions and a Pattern matcher 103 elects the best matching atom. The contribution of the chosen atom is removed from the residual signal 104 to form the residual signal of the next iteration.

The Pattern Matcher 303 basically comprises an iterative loop within the MP algorithm main loop, as shown in FIG. 3. The residual signal is compared with the functions of the dictionary by computing, pixel-wise, the correlation coefficient between the residual signal and the atom. The square of the correlation coefficient represents the energy of the atom (107). The atom with the highest energy (112) is considered as the atom that best matches the residual signal characteristics and is elected by the Pattern Matcher. The atom index and parameters and sent across (118) the Entropy Coder as shown in FIG. 2, and the residual signal is updated in consequence (104). To increase the speed of the encoding, the best atom search can be performed only on a well-chosen subset of the dictionary functions. However, such a method may result in a sub-optimal signal representation.

Figure 4:
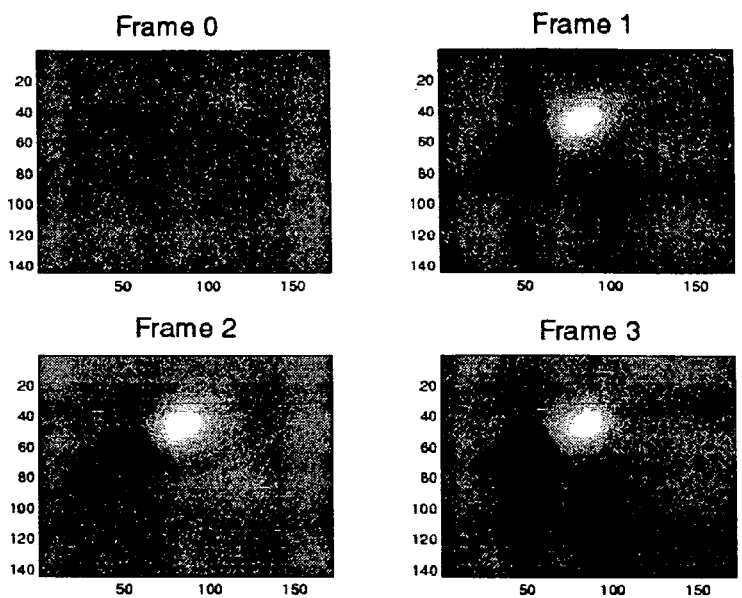
FIG. 4 shows an example of a spatio-temporal dictionary function in accordance with the present invention.
Figure 5:
FIG. 5 shows an example of video signal reconstruction after 100 Matching Pursuit iterations.
Figure 5:
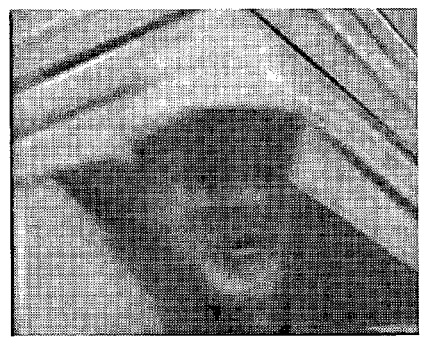
Figure 5:
Figure 5:
Figure 6:
FIG. 6 shows an example of video signal reconstruction after 500 Matching Pursuit iterations.
Figure 6:
Figure 6:
Figure 6:

FIG. 4 shows an example of a spatio-temporal dictionary unction. FIG. 5 shows an example of video signal reconstruction after 100 Matching Pursuit iterations. FIG. 6 shows an example of video signal reconstruction after 500 Matching Pursuit iterations. Clearly the amount of signal information improves with successive iterations.

The invention has been detailed in terms of a preferred embodiment. One having skill in the art will recognize that modifications may be made without departing from the spirit and scope of the invention as set forth in the appended claims.

What is claimed is:

1. A method of representing a video information stream prior to transmission to generate a video information stream representation, said method comprising:
   a. decomposing said stream by generating K frames of dimension X by Y from said stream resulting in a first residual signal;
   b. comparing said residual signal with a dictionary of functions of size K by X by Y, said dictionary containing temporal and spatial functions;
   c. selecting a dictionary function which best matches the residual signal;
   d. encoding functions of said information stream using parameters and correlation coefficients of said selected dictionary function;
   e. generating a new information stream comprising a subsequent residual signal from said encoded stream; and
   f. repeating the steps b, c, d and e on said subsequent residual signal until a predefined constraint on at least one of the number of iterations, the quality of the encoded stream, and the bit rate of the encoded stream, is met; and
   g. repeating the above steps until the end of the information stream is reached.

2. The method of claim 1 further comprising creating a dictionary comprising temporal and spatial functions prior to said generating said frames.

3. The method of claim 1 wherein said representing of said video information is done prior to encoding said video information.

4. The method of claim 1 further comprising transmitting said video stream representation.

5. The method of claim 4 further comprising encoding said video stream representation prior to said transmitting.

6. The method of claim 4 further comprising transmitting said parameters and said correlation coefficients with said video stream representation.

7. The method of claim 6 further comprising the steps of:
   receiving said video stream representation, said parameters, and said correlation coefficients at a destination location; and
   decoding said video stream representation using said parameters and correlation coefficients to regenerate said video information stream.

8. Apparatus for representing a video information stream prior to transmission, said apparatus comprising:
   a. frame buffer component for generating K frames of dimension X by Y from said stream to generate a first residual signal;
   b. pattern matcher component for comparing said residual signal with a dictionary of functions of size K by X by Y, said dictionary containing temporal and spatial functions and for selecting a dictionary function which best matches the residual signal;
   c. quantization component for encoding said information stream using parameters and correlation coefficients of said selected dictionary function and for generating a new information stream from said encoded stream, said new information stream comprising a subsequent residual signal; and
   d. threshold component for terminating said steps of comparing, selecting, encoding, and generating a new information stream from the encoded stream when a predefined constraint on at least one of the number of iterations, the quality of the encoded stream, and the bit rate of the encoded stream is met and when the end of the information stream is reached.

9. The apparatus of claim 8 further comprising a dictionary comprising temporal and spatial functions for use by said pattern matcher.

10. The apparatus of claim 8 further comprising at least one encoder component for encoding said video information.

11. The apparatus of claim 8 further comprising transmission means for transmitting said video stream representation to a destination location.

12. The apparatus of claim 11 wherein said transmission means is adapted to transmit said parameters and said correlation coefficients with said video stream representation.

13. Apparatus for receiving a video stream representation represented in accordance with the method of claim 1, said apparatus comprising:
   receiver apparatus for receiving said video stream representation, said parameters, and said correlation coefficients; and
   decoder apparatus for decoding said video stream representation using said parameters and correlation coefficients to regenerate said video information stream.

* * * * *